United States Patent
Heubner et al.

[11] Patent Number: 5,843,394
[45] Date of Patent: Dec. 1, 1998

[54] CATALYST FOR THE OXIDATION OF GASEOUS SULPHUR COMPOUNDS

[75] Inventors: Ulrich Heubner, Werdohl; Wilfried Herda, Düsseldorf; Jurgen Koppa, Schkopau; Harmut Lausch, Halle, all of Germany

[73] Assignee: Wabco GmbH, Hannover, Germany

[21] Appl. No.: 870,946

[22] Filed: Jun. 6, 1997

Related U.S. Application Data

[63] Continuation of Ser. No. 605,534, Feb. 22, 1996, abandoned.

[30] Foreign Application Priority Data

Mar. 2, 1995 [DE] Germany ............ 195 07 179.4

[51] Int. Cl.$^6$ .................................................. C01B 17/50
[52] U.S. Cl. .................... 423/542; 423/224; 423/570; 423/576.8
[58] Field of Search ................ 423/576.8, 570, 423/224, 540, 542

[56] References Cited

U.S. PATENT DOCUMENTS

| | | | |
|---|---|---|---|
| 3,565,574 | 2/1971 | Kearby et al. | 502/331 |
| 3,900,429 | 8/1975 | Komatsu et al. | 502/331 |
| 3,928,241 | 12/1975 | Niimi et al. | 502/331 |
| 4,116,884 | 9/1978 | Hayashi et al. | 252/470 |
| 4,187,282 | 2/1980 | Matsuda et al. | 423/570 |
| 4,732,688 | 3/1988 | Bryan et al. | 423/579 |
| 4,857,297 | 8/1989 | Kettner et al. | 423/576.8 |
| 4,939,113 | 7/1990 | Tauster et al. | 502/331 |
| 5,607,657 | 3/1997 | Philippe et al. | 423/576.8 |

FOREIGN PATENT DOCUMENTS

| | | |
|---|---|---|
| 0 218 302 A2 | 4/1987 | European Pat. Off. . |
| 0 565 025 A1 | 10/1993 | European Pat. Off. . |
| 1104562 | 2/1968 | United Kingdom . |

OTHER PUBLICATIONS

Kubachewski et al. Oxidization of Metals And Alloys Academic Press, NY NY 1962 pp. 126–128, 245.

*Primary Examiner*—Gary P. Straub
*Attorney, Agent, or Firm*—Proskauer Rose LLP

[57] ABSTRACT

The invention relates to an all-metal catalyst for the oxidation of gaseous sulphur compounds, more particularly hydrogen sulphide, in an oxygen-containing atmosphere, said catalyst consisting of a metal alloy of 5 to 70% by weight nickel and 30 to 95% by weight copper as residue thermally treated at temperatures of 400° to 1000° C. in an oxygen-containing atmosphere for 0.25 to 5 hours.

6 Claims, No Drawings

CATALYST FOR THE OXIDATION OF GASEOUS SULPHUR COMPOUNDS

This is a continuation of application Ser. No. 08/605,534, filed Feb. 22, 1996, now abandoned.

The invention relates to an all-metal catalyst for the oxidation of gaseous sulphur compounds, more particularly hydrogen sulphide, in an oxygen-containing atmosphere.

Gas flows containing hydrogen sulphide accumulate during the production of sulphur, for example, in the associated purification of natural gas. The hydrogen sulphide from these gases is reacted in a Claus plant to give sulphur. The small quantities of hydrogen sulphide, carbon disulphide, carbon monoxide sulphide and mercaptans must be oxidized to give sulphur dioxide before the waste gas is discharged to the atmosphere. Thermal post-combustion at temperatures around 800° C. would seem the first choice, but that process is very costly in energy. For this reason catalytic post-combustion plants have been operated for more than 20 years for the oxidation of the aforementioned sulphur compounds. In this process the waste gas is heated in a burner to the temperature required for the performance of the catalytic reaction and then introduced into the reactor, which is filled with a special catalyst. The catalyst had to meet the following demands:

the complete oxidation of the sulphur compounds to give sulphur dioxide at low temperatures;

no formation of sulphur trioxide;

high catalytic activity, expressed by space velocity;

low pressure loss.

Originally the catalytically active substance used was bauxite, that material operates satisfactorily only at temperatures around 400° C., with the accompaniment of an appreciable formation of sulphur trioxide. Subsequently aluminium oxide based catalysts became commercially available, but were unable to appreciably obviate the aforementioned disadvantages.

Nowadays use is made of special post-combustion catalysts on a ceramic basis which are charged with metal salts of the transition metals—more particularly with copper oxide and chromium (III) oxide [R. Kettner, T. Lübcke: Operation of CPC plants after Claus installations, VDI Reports 730 (1989)].

A typical example of the conditions of use and the catalytic performance of such catalysts for the oxidation of sulphur compounds is shown in Table 1:

TABLE 1

| | |
|---|---|
| gas throughput | 80 000 Nm$^3$/h |
| working temperature | 330° C. |
| catalyst amount | 45 m$^3$ |
| space velocity | 1780 h$^{-1}$ |
| pressure loss | 20 mbar |
| hydrogen sulphide in waste gas | <10 mg/m$^3$ |
| carbon monoxide sulphide and carbon disulphide in waste gas | <80 mg/m$^3$ |
| sulphur trioxide dew point | 125° C. |

These ceramic catalysts have the following disadvantages:

low turnover of carbon monoxide sulphide (71%) and carbon disulphide;

appreciable sulphur trioxide formation of approximately 10% of the sulphur dioxide, more particularly if the temperature in the catalyst bed rises to around 400° C. due to the oxidation of the hydrogen sulphide;

relatively low catalytic activity, expressed by space velocity;

relatively high pressure loss;

complicated processing of spent catalysts.

It is an object of the invention to develop for the oxidation of sulphur compounds a high-performance catalyst of simple structure and ready disposability which sore particularly causes a low pressure drop in the catalyst bed and also produces a high carbon monoxide sulphide turnover accompanied by minimized sulphur trioxide formation.

This problem is solved according to the invention by a metal alloy as a copper-containing catalyst containing 5 to 70% by weight nickel and 30 to 95% by weight copper as residue. The alloy is thermally treated in an oxygen-containing atmosphere at temperatures of 400° to 1000° C. for a period of 0.25 to 5 hours.

Metallurgically significant additives, such as, iron, manganese, zinc, chromium, phosphorus, sulphur up to 5% by weight at the expense of the quantity of copper can be added to the alloy. These elements are themselves not as catalytically effective as the metals nickel and copper according to the invention, which however have no adverse effect on their catalytic effectiveness.

Satisfactory results are also achieved by a catalyst which is a nickel alloy containing 30 to 35% by weight copper, 1 to 2.5% by weight iron, max 1.25% by weight manganese, max 0.5% by weight aluminium, max 0.2% by weight titanium and max 0.15% by weight carbon, residue nickel.

The catalyst can be used in the form of wire and/or sheet metal and/or in any other form, such as sintered metal, metal foam or turning chips having a sufficiently large specific surface.

More particularly advantageously the catalyst material can be used in the form of thin wires having diameters in the range of 0.05 to 0.30 mm. The wires are processed into knitted wire fabrics and subjected to the thermal treatment stated.

Surprisingly, the catalyst shows no demonstrable formation of sulphur trioxide in the operating range of 300° to 450° C.

In the presence of sufficient quantities of steam—i.e., in the range of 5 to 15% by volume steam in the reaction glass—the turnover of the carbon monoxide sulphide to give carbon dioxide and sulphur dioxide is over 85%.

At space velocities in the range between 5000 and 10 000 h$^{-1}$ the catalyst removes hydrogen sulphide to below the limit of demonstrability.

The catalyst operates satisfactorily even at temperatures around 300° C.

In comparison with conventional catalysts, the pressure loss in the catalyst bed drops to ⅕ to ¹⁄₁₀.

A catalyst according to the invention which has aged and has a reduced catalytic activity can be regenerated by being thermally treated in a temperature range of 400° to 1000° C. for a period of 0.25 to 5 hours.

A spent catalyst according to the invention can be melted down to give an alloy and/or fresh preliminary catalyst material.

The invention will now be explained in greater detail by the following Examples.

EXAMPLE 1

The catalysts were prepared from the metal alloys listed in Table 2. The alloys were used in the form of wire having a diameter of 0.28 mm. The wire was knitted into shaped wire members having a diameter of 20 mm and a length of 25 mm, the density of the finished shaped wire member being 0.6 g/cm$^3$.

The shaped wire members were tempered in an air atmosphere in a muffle furnace under the conditions shown in Table 2.

In each case 80 cm³ of the catalysts was introduced into a thermostated quartz reactor having a tube internal diameter of 20 mm. A mixture of gases having the following composition flowed through the reactor at a slight excess pressure, resulting from the pressure loss of the experimental plant:

325 l/h nitrogen
125 l/h carbon dioxide
60 l/h air
0.5 l/h hydrogen sulphide

From the quantity of gas and the quantity of catalyst a space velocity of 6375 h⁻¹ is obtained, which is higher than that of the prior art by a factor of 3.5.

The reactor was heated to 320° C. and thermostated. The drop in pressure in the catalyst bed was 25 mm water column in the conditions of the reaction.

After a forming phase of one hour for the particular catalysts, the hydrogen sulphide turnovers were measured which are shown in Table 2. The hydrogen sulphide concentration in the crude gas and in the pure gas was determined by gas chromatography, using a flame ionization detector, the lower limit of demonstrability being 0.1 ppm. In all cases the crude gas concentration was around 1000 ppm.

TABLE 2

| Catalyst | Composition | Temp. in °C. | Dwell time [h] | Turnover $H_2S$ [%] |
| --- | --- | --- | --- | --- |
| 1 | 87% Cu, 10% Ni, 1.5% Fe, 1% Mn, 0.5% Zn, P, S | 650 | 1 | 99.5 |
| 2 | 68% Cu, 30% Ni, 1% Mn, 0.5% Fe, 0.5% Zn, S, P | 650 | 1 | 100 |
| 3 | as 2 | 550 | 1.5 | 100 |
| 4 | 100% Cu | 600 | 1.5 | 99.7 |

In the case of catalysts 2 and 3 the hydrogen sulphide concentration at the reactor outlet was below 0.1 ppm. It is true that catalyst 1 does not reach such high hydrogen sulphide turnovers as catalysts 2 and 3, but these turnovers are adequate to ensure a hydrogen sulphide concentration at the reactor outlet of below 10 ppm, so that this catalyst is still suitable for industrial use.

None of the catalysts showed any decline in activity after 16 hours' testing.

In contrast with the other catalysts, the comparison catalyst 4 of pure copper showed distinct corrosive attacks on the metallic base member, so that this catalyst cannot be recommended for long-term industrial use.

EXAMPLE 2

In the same conditions as in Example 1 a quantity of 500 ppm carbon monoxide sulphide was added to the crude gas in the presence of catalyst 2. The carbon monoxide sulphide was determined by gas chromatography, using a flame ionization detector.

Without the addition of steam the carbon monoxide sulphide turnover was approximately 30%. Water was sprayed into the cool crude gas, the steam concentration in the reactor being between 5 to 15% by volume, the carbon monoxide sulphide turnover increased to 88%. The hydrogen sulphide turnover remained unchanged at practically 100%.

This result indicates that the carbon monoxide sulphide turnover is not only a question of the particular catalyst, but is very substantially determined by the steam concentration in the reactor, the carbon monoxide sulphide turnover increasing with rising steam concentration.

Since steam concentrations in the range of 5 to 15% by volume are present in the industrial reactor, carbon monoxide sulphide turnovers of the order of magnitude of above 85% can be achieved using the catalyst according to the invention. These turnovers are clearly above the prior art values.

No possible formation of sulphur trioxide could be observed in any of the catalysts used. No kind of sulphur trioxide mists when the gas flowed through a cooler and also a washing bottle filled with an aqueous solution.

EXAMPLE 3

Catalyst 2 was artificially so aged at a temperature of 250° C. by charging with a low-oxygen gas, containing less than 1% by volume oxygen and 10 000 ppm hydrogen sulphide, that its activity dropped to 90% of the original activity in the aforementioned reaction conditions normal in catalyst testing. The catalyst was then regenerated in an air atmosphere for 1 hour in a muffle furnace at 600° C. Thereafter the regenerated catalyst was incorporated in the reactor and tested in the aforementioned conventional reaction conditions. The hydrogen sulphide turnover again rose to 100%.

We claim:

1. A method for oxidizing gaseous hydrogen sulphide, carbon monoxide sulphide, or combinations thereof, comprising, in an oxygen-containing atmosphere, bringing said compounds into contact with a metal alloy catalyst initially consisting essentially of 5 to 70% by weight nickel and 30–95% by weight copper as residue, said metal alloy catalyst having been thermally treated at a temperature of 400°–1,000° C. in an oxygen-containing atmosphere for 0.25 to 5 hours.

2. The method of claim 1 wherein said metal alloy catalyst is in the form of a sintered metal, a metal foam, turning chips, or a knotted fabric of wires each of which has a diameter of 0.05 to 0.30 mm.

3. The method of claim 1 wherein said metal alloy catalyst has been regenerated by a thermal treatment at a temperature of 400° to 1000° C. in an oxygen-containing atmosphere for 0.25 to 5 hours.

4. The method of claim 1 wherein said oxidizing atmosphere contains 5 to 15% by volume steam.

5. A method for oxidizing gaseous hydrogen sulphide, carbon monoxide sulphide, or combinations thereof, comprising, in an oxygen-containing atmosphere, bringing said compounds into contact with a metal alloy catalyst initially consisting essentially of 5 to 70% by weight nickel, not more than a total 5% by weight of iron, manganese, zinc, chromium, aluminum, titanium, carbon, phosphorous, sulphur, and combinations thereof, and 30–95% by weight copper as residue, said metal alloy catalyst having been thermally treated at a temperature of 400°–1,000° C. in an oxygen-containing atmosphere for 0.25 to 5 hours.

6. The method of claim 5 wherein said metal alloy catalyst consists essentially of 30 to 95% by weight Cu, 1 to 2.5% by weight Fe, up to 1.25% by weight Mn, up to 0.5% by weight Al, maximum 0.2% by weight Ti, up to 0.15% by weight C, and the balance nickel.

* * * * *

UNITED STATES PATENT AND TRADEMARK OFFICE
CERTIFICATE OF CORRECTION

PATENT NO. : 5,843,394
DATED : Dec. 1, 1998
INVENTOR(S) : Ulrich Heubner, et al.

It is certified that error appears in the above-indentified patent and that said Letters Patent is hereby corrected as shown below:

The title page:
Item [75],
The Inventors should read:
Ulrich Heubner, Wilfried Herda, Jürgen Koppe, Hartmut Lausch
Item [73],
The Assignee should read:
Krupp VDM GmbH Signed and Sealed this Fifth Day of October, 1999

Attest:

Q. TODD DICKINSON

*Attesting Officer*     *Acting Commissioner of Patents and Trademarks*